Dec. 30, 1941.  R. O. DAHLSTROM  2,268,020
COUPLING VALVE
Filed Feb. 1, 1941
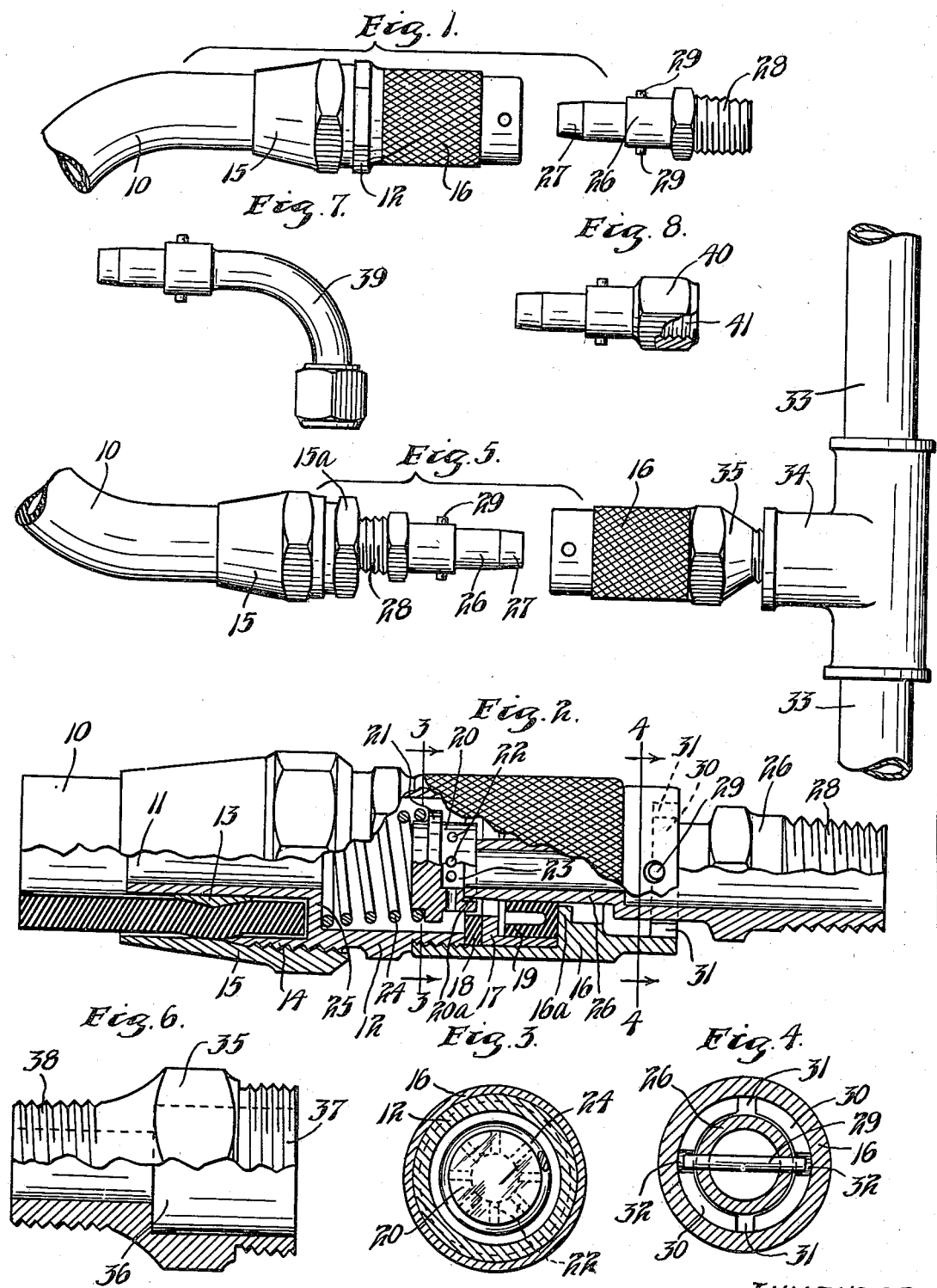
INVENTOR.
REUBEN O. DAHLSTROM
BY HIS ATTORNEYS.
Williamson & Williamson Patented Dec. 30, 1941

2,268,020

UNITED STATES PATENT OFFICE 2,268,020

COUPLING VALVE

Reuben O. Dahlstrom, Milaca, Minn.

Application February 1, 1941, Serial No. 376,971

1 Claim. (Cl. 284—19)

This invention relates to coupling members and more particularly to couplings for use in pressure lines which conduct fluids such as compressed air. Pressure air hoses with which my coupling can be used with advantage are those such as are used in dental offices and also in industrial equipment such as pneumatic hammers and drills.

Numerous types of valved air line coupling members have been developed heretofore but after a period of use the valves in said couplings fail to seat properly and there is a resulting loss of air and pressure. This disadvantage is particularly prevalent where the couplings are used in connection with pneumatic hammers and the like, and the vibration to which they are subjected quickly wears them so that the movable valve members do not properly align themselves with the valve seat. In most of these structures the valve head is guided by a relatively stationary portion of the coupling and the guide becomes worn and improper functioning results.

It is a general object of my invention to provide a valved coupling including a female member and a male member insertable therein wherein the male member moves the valve head from its seat as the two members are connected together, and wherein the valve head has what might be termed a full floating action relative to the remainder of the coupling and wherein it is retained in proper relationship to the valve seat without providing relative rigid guides therefor.

These and other objects and advantages of the invention will more fully appear from the following description made in connection with the accompanying drawing, wherein like reference characters refer to the same parts throughout the views, and, in which:

Fig. 1 is a side view of an embodiment of my invention;

Fig. 2 is an enlarged view partially broken away and partially in section of an assembly such as that shown in Fig. 1;

Fig. 3 is a section taken approximately on the line 3—3 of Fig. 2;

Fig. 4 is a section taken approximately on the line 4—4 of Fig. 2;

Fig. 5 is a side elevation of an adaptation of my invention for coupling a hose with a supply pipe;

Fig. 6 is a view partially in section of the pipe connecting sleeve shown at the right-hand side of Fig. 5;

Fig. 7 is a curved male connecting member such as might be used in connection with a spray gun; and Fig. 8 shows a straight connecting stem with an internally threaded portion at one end.

In Figs. 1 and 2 there is illustrated an air hose 10 whose end has received therein a sleeve 11 formed on the end of a female coupling member 12. Around the sleeve is disposed a band 13 which has bevelled outer surfaces as shown in Fig. 2. A threaded flange 14 extends concentrically to the sleeve 11 for a portion of the length of the latter and the flange 14 overlies the end of the tubing 10. A threaded collar 15 is secured upon the threaded flange 14 and is adapted to press the tubing 10 against the bevelled collar 13 to tightly grip the same. The female coupling member 12 has a cylindrical element 16 threadedly connected thereto and a substantially L-shaped annulus 17 is positioned within the sleeve 16 to provide an inwardly extending annular shoulder. A rubber or other suitable packing ring 18 lies against the inwardly extending shoulder of the annulus 17, and these parts are held rigidly in position due to the clamping action between the end of the female connecting member 13 and the shoulder 16a on the sleeve 16. A rubber packing ring 19 is also positioned within the sleeve 16 as is well known in the art.

A valve head 20 having an annular flange 21 is positioned within the female member 12 and, as clearly shown in Fig. 2, the valve head 20 is of considerably less diameter than the interior diameter of said member 12. It should also be noted that the right-hand portion of said valve head 20 projects into the annular packing ring 18 with considerable clearance between said head and packing ring so that there is no guiding action of the head by the packing ring or any other relatively stationary part of the coupling. The head 20 is provided with a plurality of openings 22 which afford communication from the exterior of said head to an interior hollow portion 23. Thus when the valve is off its seat, as shown in Fig. 2, air can flow from the left through the hose 10, around the left-hand portion of the valve head 20, through the openings 22, and hollow portion 23 to the right-hand side of the valve head. The right side of head 20 is also provided with a countersink 20a whose function is set forth below.

Positioned in the member 12 is a substantially frusto-conical coil spring 24 whose larger end rests against a shoulder 25 forming a part of the element 12, and the smaller end of the spring 24 fits around the left-hand portion of the valve head 20 and bears against the valve head flange 21 thus yieldably urging the valve head toward the packing ring on seat 18. The smaller end of the spring 24 is shown to be of considerably less diameter than the interior of said member 12 at that portion where the spring is located, while the larger end is of substantially the same size as the inner diameter of the member 12.

A male coupling member 26 is shown in Figs. 1, 2 and 5, and is provided with a tapered end portion 27 and a threaded end 28. The coupling member 26 can be suitably connected to a pipe line, tool or other device to which air is to be supplied. This coupling member has a pair of oppositely disposed pins or lugs 29 extending radially therefrom, and the tapered end 27 is adapted to be inserted into the sleeve 16 which forms a portion of the female coupling member. The sleeve 16 is provided at its right-hand end with an inwardly extending flange 30. This flange has a pair of cut-outs 31 formed therein adapted to admit the lugs 29 on the male coupling member 26 when the member is inserted in sleeve 16. The inner side wall of the flange 30 is provided with a pair of sockets or depressions 32 which, as best shown in Fig. 4, are at right-angles to the cut-outs 31. When the male member 26 is inserted in the sleeve 16, it is turned 90 degrees so that the pins or lugs 29 will seat in the depressions 32. They are held in this position by the action of the coil spring 24 which bears against the valve head 20, the latter being in contact with the inner end of the male coupling member 26.

Insertion of the male member 26 in the sleeve 16 brings the inner end of member 26 into contact with the shoulder formed by the countersink 20a in the inner hollow portion 23 of the valve head 30, and moves said valve head to the left, as viewed in Fig. 2. This movement is against the action of the frusto-conical spring 24. Air can then flow through the apertures 22 in the valve head and through the bore of the male coupling member 26. When the member 26 is removed from the sleeve 16, the valve head 20 will follow said member 26 as it is withdrawn and will seat tightly against the packing ring 18 entirely around the valve head flange 21. This is due to the fact that the valve head 20 is substantially floating in the female coupling member and can be pressed evenly against the packing ring 18 by the action of the coil spring 24. The spring 24 which holds the valve head in position cannot be displaced because of the fact that its larger end is substantially the same size as the inner diameter of the female coupling sleeve 12. However, movement of the valve head 20 to a proper seating position is permitted due to the lesser diameter of the valve head and the smaller end of the spring 24 as compared to the interior of the coupling sleeve 12. Furthermore, the shoulder of the countersink 20a causes the valve head 20 to follow the coupling member 26 in such a manner as to insure proper engagement of said head with the packing ring 18.

In Fig. 5 there is shown a pipe line 33. Connected to the T 34 in the pipe line 33 is an adapter 35, best shown in Fig. 6. The adapter 35 takes the place of the female coupling sleeve 12, and in its enlarged interior portion 36 the coil spring 24 and valve head 20 are adapted to be located. A threaded portion 37 on said adapter 35 is adapted to engage the internally threaded portion of the coupling sleeve 16. The other end of the adapter is provided with threads 38 which are adapted for connection with the T 34. The collar 15 in Fig. 5 has an adapter 15a connected thereto to receive the threaded portion 28 of the coupling member 26.

Fig. 7 illustrates a curved sleeve or male connector member 39 which can be used on spray guns or other articles where a connection of that shape is desired.

In Fig. 8 there is shown a male coupling member 40 which has an internally threaded portion 41, which may be used where such a connection is advantageous.

From the foregoing description it will be seen that I have provided a valved air hose coupling which can be connected and disconnected quickly, and wherein the movable valve head is so supported in the coupling by its spring and the male coupling member that it will at all times properly seat against the packing ring and wherein such seating is not effected by jarring of the connection and wherein no relatively stationary guides are provided which might wear after extensive use and prevent the valve from closing properly. I have also provided a simple and effective bayonet joint type of connector for the male and female coupling members which will securely hold them and wherein the connection is tightened by the action of the spring which bears against the air valve head.

It will, of course, be understood that various changes may be made in the form, details, arrangement and proportions of the various parts without departing from the scope of my invention.

What is claimed is:

In a coupling, a female member including a part adapted for attachment to a hose and having a bore of relatively small diameter at the hose attaching end and a bore of relatively large diameter at the other end defined from the small diameter bore by an abrupt shoulder, a second part having a bore of relatively large diameter screwed into the larger bore end of the first part, said second part having a bore of relatively small diameter at its other end and a shoulder between its bores, a sleeve in the second part resting on the shoulder of the second part at one end and having an internal flange at its other end, an elastic annular valve seat clamped between the flanged end of the sleeve and the adjacent end of the said first part, a valve having a diameter less than the opening in the valve seat and provided with a flange closing on said valve seat, a spring between the valve flange and the shoulder of said first part and urging said valve to close, said valve being provided with a laterally ported recess in the end entering the valve seat opening, a packing ring disposed between the flange of the sleeve and the shoulder of the second part, and a tubular male member fitting in said packing ring and sealing the valve at the periphery of said recess.

REUBEN O. DAHLSTROM.